United States Patent [19]

Brackmann et al.

[11] 4,073,850
[45] Feb. 14, 1978

[54] METHOD OF PRODUCING POLYMERIC MATERIAL

[75] Inventors: Warren A. Brackmann, Cooksville; Daniel DiIanni, Toronto, both of Canada

[73] Assignee: Rothmans of Pall Mall Canada Limited, Toronto, Canada

[21] Appl. No.: 530,708

[22] Filed: Dec. 9, 1974

[51] Int. Cl.² ............................................. B29C 17/06
[52] U.S. Cl. ........................................ 264/93; 264/12
[58] Field of Search .................. 264/176 F, DIG. 75, 264/93, 12, 11, 14; 425/72, 464

[56] References Cited

U.S. PATENT DOCUMENTS

| | | | |
|---|---|---|---|
| 2,411,660 | 11/1946 | Manning | 264/DIG. 75 |
| 2,437,263 | 3/1948 | Manning | 264/DIG. 75 |
| 2,508,462 | 5/1950 | Marshall | 264/176 F |
| 2,571,457 | 10/1951 | Ladisch | 264/DIG. 75 |
| 3,015,127 | 1/1962 | Stalego | 264/DIG. 75 |
| 3,017,664 | 1/1962 | Ladisch | 264/DIG. 75 |
| 3,093,315 | 6/1963 | Tachiki et al. | 264/12 |
| 3,379,811 | 4/1968 | Hartmann et al. | 264/DIG. 75 |
| 3,436,792 | 4/1969 | Hench | 264/DIG. 75 |
| 3,825,379 | 7/1974 | Lohkamp et al. | 264/DIG. 75 |
| 3,885,014 | 5/1975 | Fukada et al. | 264/DIG. 75 |
| 3,888,610 | 6/1975 | Brackmann et al. | 425/72 |
| 3,911,173 | 10/1975 | Sprague | 264/176 F |
| 3,937,772 | 2/1976 | Urban et al. | 264/14 |
| 3,942,723 | 3/1976 | Langdon | 425/72 S |
| 3,959,421 | 5/1976 | Weber et al. | 264/14 |
| 3,981,650 | 9/1976 | Page | 425/72 S |

*Primary Examiner*—Jay H. Woo
*Attorney, Agent, or Firm*—Sim & McBurney

[57] ABSTRACT

An extrusion head is provided in which molten polymeric material is formed into fibres by providing individual air streams for each orifice of a plurality of extrusion orifices formed in a straight line across the width of the head to draw out and convey individual polymeric material fibres from polymeric material extruded from each orifice, the individual fibres being separated from each other by the individual air streams to prevent coalescing of the fibres to form bundles while they are still molten. Each orifice is formed at the line of intersection of two sloping surfaces of a unitary wedge shaped body and preferably has a circular cross section in the elevational view and a part-elliptical cross section in the plan view to allow metering of the extruded molten material into the air streams over a flow path immediately upstream of the line of intersection.

4 Claims, 6 Drawing Figures

METHOD OF PRODUCING POLYMERIC MATERIAL

FIELD OF INVENTION

The present invention is directed to the formation of polymeric fibers, in particular to methods of producing polymeric fibers and an extrusive head for use in an apparatus for the production of polymeric fibers.

BACKGROUND OF THE INVENTION

In an article entitled "Superfine Thermoplastic Fibers" by Van A. Wente in Industrial and Engineering Chemistry vol. 48, no. 8, August 1956, pp. 1342 to 1346, there is described an extrusion head for producing thermoplastic material fibers of extremely small fiber size. The head includes a nozzle provided in two cooperating joined halves with a plurality of fine extrusion channels extending through the head and terminating in circular orifices. The channels are provided by slots milled in a flat surface of one half of the head and then matched with identical slots milled into an abutting surface of the other half of the head.

Two converging high velocity hot streams of air are provided by two elongated openings positioned in the extrusion head and extending parallel to the row of orifices and slightly beyond the two lateral extremities of the row.

The use of two lamina convergent flows of air to draw out and convey filaments from molten material extruded from the row of orifices provides control difficulties in ensuring that the filaments do not become joined or otherwise associated with one another, and hence form bundles or ropes, until they have cooled sufficiently and are desired to be collected.

In addition, considerably more air volume is required than is actually used in the drawing and conveying of the filaments, resulting in waste of air and heat value thereof.

One attempt to overcome these problems is described in copending U.S. application Ser. No. 391,266 filed Aug. 24, 1973, (now U.S. Pat. No. 3,888,610) wherein molten polymeric material is extruded from a plurality of needle-like conduits communicating with a common source of polymeric material. The conduits each have circular orifices so that polymeric material extruded therefrom is unconfined in all directions. A separate flow stream of hot air is provided for each conduit to draw filaments from the extruded molten material and to maintain the filaments separate from one another until they may be collected without roping.

Considerable control difficulties have arisen with this arrangement, resulting in many instances in the production of considerable quantities of spherical polymer particles rather than the described fibers. Thus, unless the flow rates of molten material and air are carefully controlled, difficulties arise in consistently producing fibers.

An additional problem arises in the use of the nozzle described in the Wente article. The pressure required for extrusion of the molten material sometimes causes separation of the two body halves, leading to the complete absence of proper filament formation.

SUMMARY OF THE INVENTION

The present invention, in contrast to this prior art, provides a method of forming polymeric fibers and an extrusion head which are reliable and operable over a wide range of conditions without bundling or forming non-fibered polymer.

In the present invention, a pair of converging individual hot air flow stream is provided for each orifice, the molten polymeric material is extruded from the orifice partly into each of the converging air streams in a gradual manner in the direction of the flow of the air streams so that the extrusion is complete immediately prior to merging of the air streams to form a single air stream, conveying a single filament of molten material away from each orifice and the molten material as it is extruded into the converging air streams is confined in the regions of the orifice not exposed to the air streams.

The extrusion head comprises an elongate body member having a generally wedge shaped cross section including two planar sloping faces convergent to and terminating at a line of intersection; a plurality of capillary-like substantially circularly cross sectioned channels of substantially the same cross-sectional size located in the body member and each extending from an individual orifice formed at the line of intersection spaced apart from the individual orifices of the other channels internally of the body member substantially parallel to and separated from others of the channels and substantially perpendicular to the line of intersection; each of the orifices typically having a circular cross section in elevation view and a part-elliptical cross section in plan view; first supply means in fluid flow communication with the ends of the plurality of channels remote from the line of intersection for feeding molten polymeric material to the plurality of channels towards the orifices; a first elongate block member having a face of complementary shape to that of one of the two planar sloping faces and secured in engagement with the one of the two planar sloping faces, a second elongate block member having a face of complimentary shape to that of the other of the two planar sloping faces and secured in engagement with the other of the two planar sloping faces; the complementarily-shaped faces each having one longitudinal edge located substantially common with the line of intersection, whereby the block members engage each other at the line of intersection; a plurality of grooves formed in each of the complementarily-shaped faces of equal number to each other and to the number of the plurality of capillary-like channels, each of the grooves defining a passage with the adjacent planar sloping face of the body member; the grooves in each of the complementarily-shaped face being parallel to each other and extending substantially perpendicularly to the one longitudinal edge of the respective complementary-shaped faces, each of the grooves having substantially the same cross-sectional shape; respective grooves in each complementarily-shaped face being arranged to lie in a plane including one of the channels and situated substantially perpendicularly to the line of intersection; respective grooves terminating at the line of intersection in an opening, typically dimensioned to include the circular cross section of the particular orifice of the one of the channels in its periphery when viewed in elevational view; and second supply means in fluid flow communication with each of the plurality of passages remote from the line of intersection for feeding air under pressure to the plurality of passages towards the line of intersection.

Thus, in the present invention, individual air streams are associated with individual extrusion orifices achieving effective separation of fibers one from another by the air streams at least during the period immediately after extrusion and hence the tendency to form bundles of joined fibers is minimized.

Further, all the hot air which is provided at the line of intersection is utilized to draw fibers from the extruded mass thereby achieving economic air and heat utilization. Additionally, the orifices through which the molten polymeric material is extruded are shaped so that progressively a greater quantity of molten material is fed into the air streams and the molten material is confined laterally. This procedure allows the ready control of the formation of fibers and the formation of material particles of polymeric material is substantially eliminated.

DESCRIPTION OF PREFERRED EMBODIMENT

Figure 1:
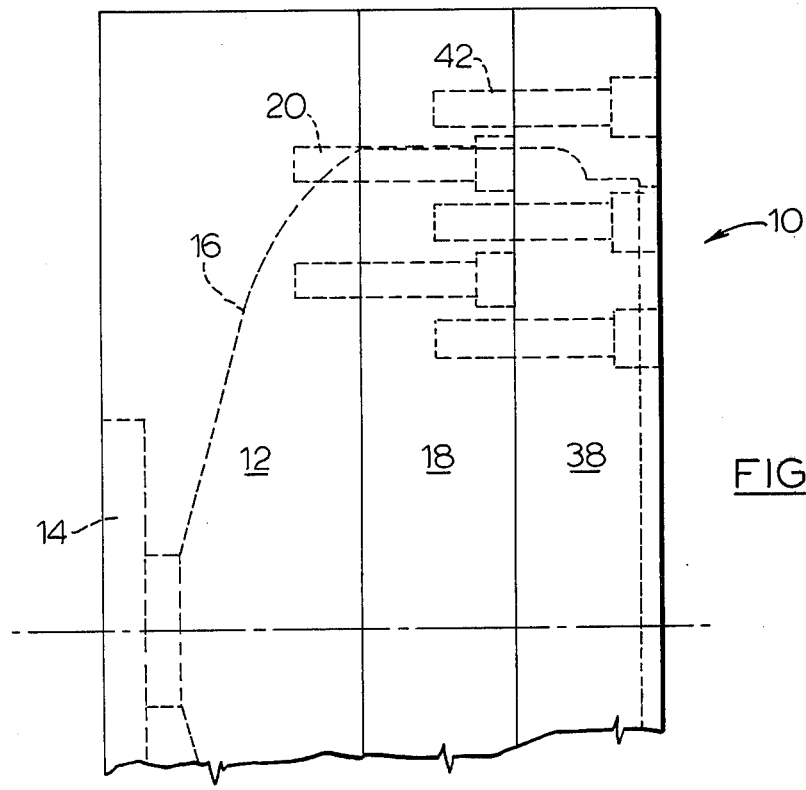
FIG. 1 is a plan view of an extrusion head in accordance with one embodiment of the invention.
Figure 2:
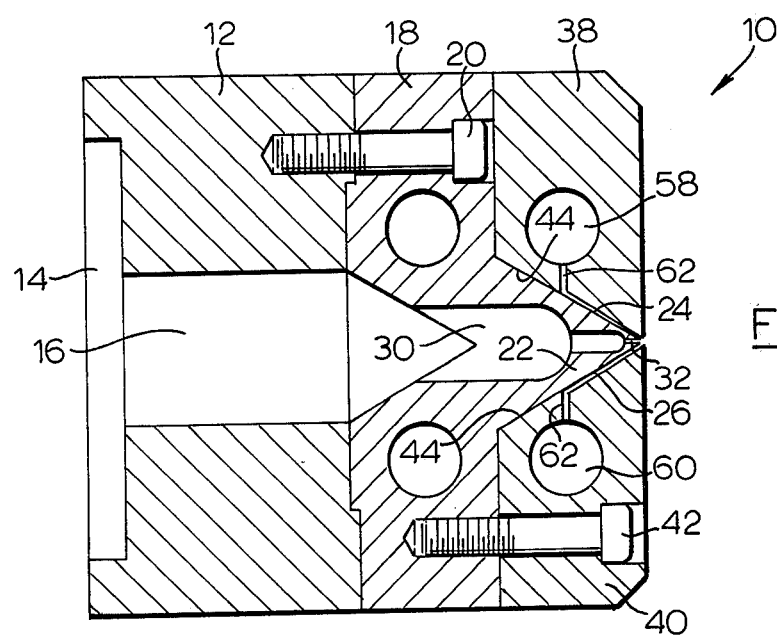
FIG. 2 is a sectional view taken on line 2—2 of FIG. 1.
Figure 3:
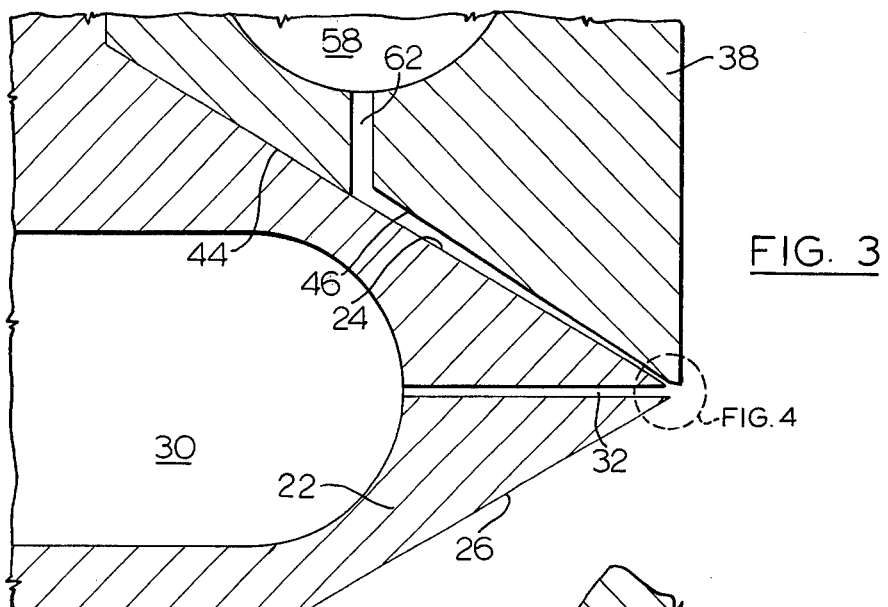
FIG. 3 is an enlarged detail of part of the sectional view of FIG. 2.

As seen in the drawing, an extrusion head 10 includes an elongate rectangular support block 2 having an opening 14 in one side thereof to receive molten polymeric material from an extruder (not shown) of any convenient construction. The opening 14 is associated with an internal chamber 16 to establish a feed means source of molten polymeric material in the estrusion head 10.

A body member 18 is secured by bolts 20 to the support block 12 and has an elongate protrusion 22 extending from one face thereof, the protrusion having converging planar faces 24 and 26 converging to and terminating at a line of intersection 28.

A cavity 30 in fluid flow communication with the internal chamber 16 is provided in the body member 18. A plurality of capillary-like channels 32 is provided extending from and perpendicularly to the line of intersection 28 to the cavity 30 to establish a plurality of separate parallel liquid polymer flow paths from the cavity 30 to exteriorally of the body member 18.

The channels 32 have the same substantially circular cross-sectional dimension, are parallel to and separated from each other and terminate in an orifice 34 at the line of intersection 28.

Figure 5:
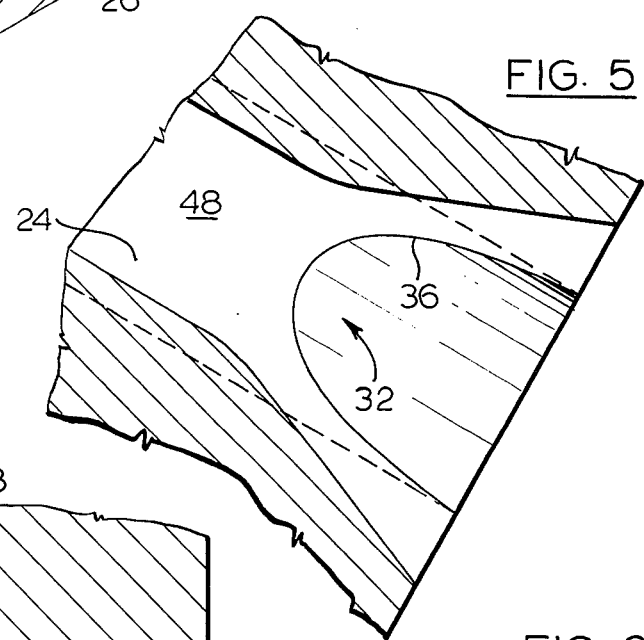
FIG. 5 is a plan view of the orifice shown in FIG. 4 taken along line 5—5 thereof.
Figure 6:
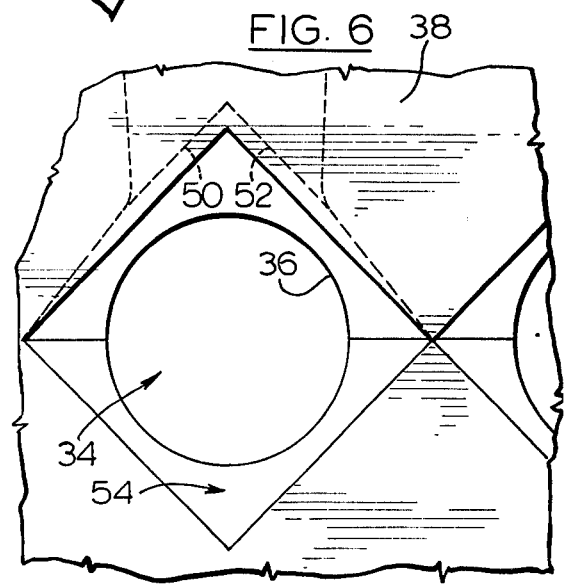
FIG. 6 is an elevational view of the orifice shown in FIG. 4.

As may clearly be seen in FIGS. 5 and 6, in the illustrated embodiment the orifices 34 in elevation view (FIG. 6) have a circular cross section while in the plan view (FIG. 5) they have a part elliptical cross section, as defined by the periphery 36.

The plan view of the orifice in FIG. 5 illustrates a part-elliptical periphery 36. This shape is preferred since it is readily provided in drilling of the channels 34. However, any other desired geometrical shape, such as parabolic, triangular, oval or part-rectangular, may be provided, to meter extruded molten material vertically from the orifice 34 while the molten material is laterally confined.

Similarly, the circular elevational-view shape of the orifices 34 is preferred, but may be provided in any desired geometrical shape, such as oval, oblong or square.

Two elongated block members 38 and 40 are situated one on each vertical side of the protrusion 22 and are secured to the body member 18 by bolts 42. Each of the block members 38 and 40 has a face 44 complementarily angled with respect to the adjacent planar face 24 and 26 of the protrusion 22 and is in engagement therewith. The faces 44 have one longitudinal edge which engage each other the line of intersection 28.

In each of the faces 44 is situated a plurality of grooves 46 which extend from the line of intersection 28 perpendicularly thereto in parallel fashion and in number the same as the number of channels 34.

The grooves 46 define with the adjacent planar face 24 and 26 of the protrusion 22 a plurality of passages 48. The grooves 46 in the illustrated embodiment each has walls 50 and 52 which meet at an angle. The respective grooves in the blocks 38 and 40 and one of the channels 38 lie in the same vertical plane with the plane being perpendicular to the line of intersection 28, so that the respective grooves 46 meet in an opening 54 at the line of intersection 28.

The grooves 46 preferably are dimensioned and shaped so that in the elevational view the opening 54 is square and encompasses the periphery 36 of the respective orifice 34 wholly within its periphery. The latter dimensioning is preferred to minimize gumming or clogging of the opening 54 by any polymeric material not drawn through the opening 54 with the air stream. While the opening 54 is shown as being square, for ease of formation thereof, different cross sectional forms may be provided, such as circular.

Figure 4:
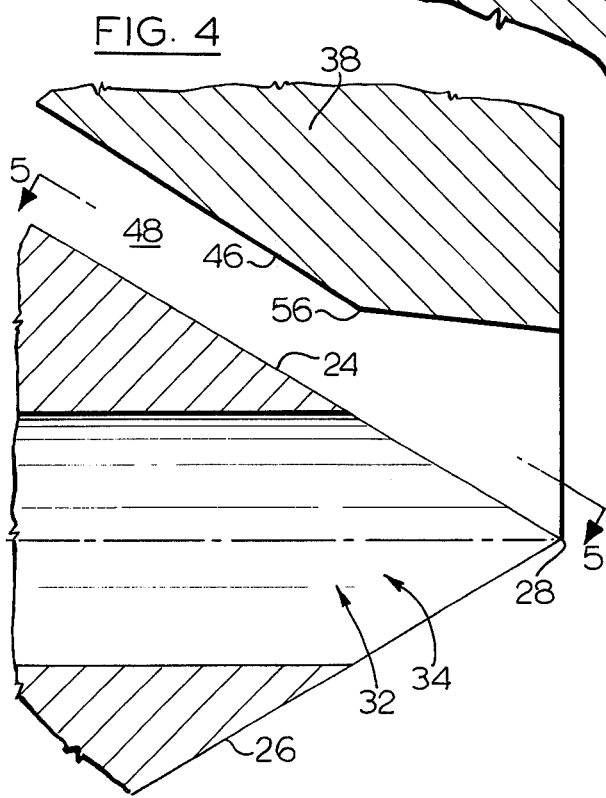
FIG. 4 is a much enlarged detail of part of the sectional view of FIG. 3.

As may be seen in detail in FIG. 4, the walls 52 and 54 of the grooves 46 are dimensioned so that the cross-sectional area thereof decreases while the lateral spacing of the free extremities of the walls 52 and 54 decreases, i.e. the opening flares inwardly, from the line of intersection 28 to a throat or shoulder 56 located immediately forwardly of the innermost position of periphery 36 of the orifice 34 and thereafter the grooves 46 increase in cross sectional dimension at a slower rate than the decrease in cross sectional area. The provision of the shoulder 56 in this way may provide a nozzle effect, the air in the passages 48 accelerating to the shoulder 56 and thereafter, under the influence of the pressure at the shoulder 56, accelerating further in the expansion chamber between the shoulder 56 and the orifice 34. The shoulder 56 may be omitted, if desired, providing the groove 46 with the same cross sectional size along the length thereof.

An elongated gallery 58 and 60 is located within and extends substantially coextensive of the block members 38 and 40 and the galleries 58 and 60 are situated in fluid flow communication with a source of compressed air (not shown).

A plurality of separate conduits 62 join the galleries 58 and 60 to the plurality of passages 48, thereby establishing compressed air supply means in fluid flow communication with the passages 48, providing for each orifice 34 two converging air streams in the passages 48.

Molten polymeric material is extruded into each of the converging air streams from the opposite vertical sides of the (plan view) part elliptical opening of the orifice 34, while the molten polymeric material is confined laterally by the metal defining the elliptical perimeter 36 of the orifice 34.

The extrusion of the molten polymeric material takes place over a path length of each of the converging air streams immediately upstream of the line of intersection 28 which also constitutes the point of merger of the streams. The polymeric material thus is metered into the converging streams in increasing amounts while the streams are separate and the metering is substantially complete immediately prior to merging of the convergent streams at the line of intersection 28, while the molten material is prevented from being extruded other than into the converging air streams.

The presentation of the extruded molten material gradually into the converging air streams results in a reliable, clean-operating system operable over a wide range of conditions, in contrast to the procedure in accordance with the copending application mentioned above.

The high speed merged air stream then draws or stretches the extruded material into a fiber which is converged by the air stream flowing through the opening 54 and away from the extrusion head. The fiber is encased by the air stream and hence is insulated from the other fibers. The contact of fibers formed from the extruded material at the orifices 34 one with another prior to their solidification is avoided, thereby overcoming the building problem of the prior art nozzle disclosed in the Wente article.

Since all the compressed air in the galleries 58 and 60 is used to draw fibers from the extruded molten material by use of the passages 48, the wasteful use of air and the heat content thereof as described in the prior art is avoided.

By positioning the shoulder 56 immediately forward of the rearward extremity of the periphery 36 of the orifice 34, the molten polymeric material is first exposed to the converging air streams when the latter have achieved their highest velocity in the passages 48 upstream of the shoulder 56 and thereafter the extruded polymeric material is subjected to an air stream accelerating towards the opening 54.

The extrusion head of the invention may be used to form filaments from a variety of polymeric materials, including polymers or copolymers of olefins, polymerizable esters and polymerizable amides. Polyolefins which may be used include polyethylene, polypropylene and polymers of substituted olefins, such as polytrifluorochloroethylene. Many polyesters may be used, such as polyethylene terephthalate and poly (methyl methacrylate.). A typical poly (methyl methacrylate) which may be used is that sold under the trademark "ACRYLITE" H. 12. Among the polyamides which may be utilized are nylon 6, nylon 66 and nylon 610. Other thermoplastic polymeric materials such as polystyrene also may be employed.

SUMMARY

The present invention therefore provides an extrusion head which allows the reliable continuous production of polymeric material fibers from molten polymeric material with economic utilization of air.

What I claim is:

1. A method of extruding molten polymeric material in fiber form which comprises:
    converging two individual streams of air of narrow width to a merging zone for formation of a single combined air stream flowing away from said merging zone,
    conveying molten polymeric material along a flow path towards said merging zone in straight line alignment with the flow path of the single combined air stream,
    said flow path of said molten polymeric material and the paths of said converging individual air streams lying in a first plane,
    extruding molten polymeric material from said conveyed molten polymeric material separately and simultaneously into each of said converging air streams over a predetermined path length of said air streams immediately upstream of said merging zone while preventing the extrusion of said conveyed molten polymeric material other than into said converging air streams over said predetermined path length,
    drawing a single fiber from said extruded polymeric material, and
    conveying said fiber away from said merging zone in said single air stream.

2. The method of claim 1 wherein a plurality of said molten material flow paths is provided from a common source thereof, and two individual converging air streams of narrow width, a merging zone and a single combined air stream is provided for each of said plurality of molten material flow paths, the members of said plurality of flow paths being parallel to each other, lying in a second plane perpendicular to said first plane and terminating at the remote end from said common source in a straight line.

3. The method of claim 2 including accelerating each of said converging air streams to provide a maximum velocity of said acceleration immediately downstream of the commencement of the extrusion of molten polymeric material into said converging air streams and thereafter further increasing the velocity of each of said converging air streams to said merging zone.

4. The method of claim 1 wherein said polymeric material is poly (methyl methacrylate).

* * * * *